Figure 1:
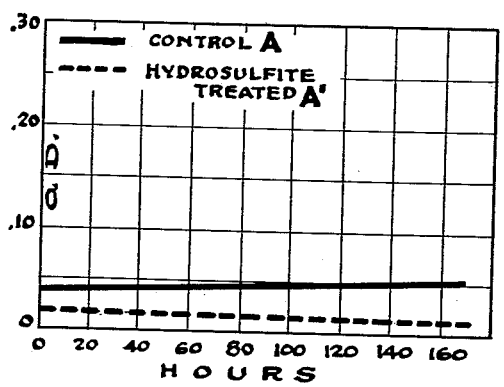

June 19, 1962 — S. H. BECK — 3,039,931
HEPARIN COLOR STABILITY
Filed April 11, 1958

COLOR DEVELOPMENT WITH PHENOL-HEPARIN SOLUTIONS
PREPARED FROM SEPARATE HEPARIN LOTS A AND B

SOLUTIONS STORED AT 60°C.

SOLUTIONS STORED AT 75°C.

Inventor
Stanley H. Beck
By Edmund Godula
Attorney

United States Patent Office 3,039,931
Patented June 19, 1962

3,039,931
HEPARIN COLOR STABILITY
Stanley H. Beck, Waukegan, Ill., assignor to Abbott Laboratories, North Chicago, Ill., a corporation of Illinois
Filed Apr. 11, 1958, Ser. No. 727,854
7 Claims. (Cl. 167—74)

This invention relates to color-stable heparin and color-stable solutions of heparin, and to a novel method for treating heparin and heparin solutions to achieve a color-stable form. In particular, it relates to the preparation of heparin powder which results in substantially less color formation upon reconstitution into solution form.

Heparin is a widely known and valuable anticoagulant substance which is universally used by physicians and in hospitals. A serious disadvantage occurring frequently with heparin solutions is the development of color which varies in hues of red-brown. While it is possible that said color formation does not affect potency of the heparin solution, said color formation is still objected to by the ultimate consumer. Heparin solutions which develop such colors are frequently returned to the manufacturers thereof. This, of course, entails an economic burden on any manufacturer and seller of heparin.

An object of this invention is to devise a method for color stabilizing heparin and heparin solutions.

Another object of this invention is to treat heparin by a method which will preclude subsequent color formation in solution.

A still further object is to provide a method for decolorizing stock heparin which is known to develop color.

Still another object is to provide a method for decolorizing and preventing subsequent color formation in heparin solutions.

In accordance with the foregoing objects and other objects which will be apparent, a method is now provided whereby crude or purified heparin is treated with agents to remove color formation and also to prevent color formation. Such agents are found to be compounds provided a source of sulfite ions, such as hydrosulfites, metabisulfites, bisulfites and sulfites, collectively referred to as alkali sulfites. The starting heparin may be relatively impure heparin extracted from tissues such as lung or duodenum, or it may comprise recrystallized and purified heparin from these foregoing tissues. Such extracted heparins are known to develop color formation when placed in solution; however, this color formation is particularly present when phenol is added as a preservative. Other preservatives such as p-methylaminobenzoate are also known to induce additional color formation. Heparin solutions, which develop color after such addition, are commonly referred to as "phenol-sensitive" solutions.

The novel method of this invention substantially provides, in one embodiment, preparing a solution from stock heparin and, thereafter, adding one of the foregoing color-stabilizing agents. The addition of a compound providing sulfite ions will reduce already formed color, as well as prevent subsequent color formation. In a preferred embodiment, sulfite is added to a heparin solution for a short period, after which, the sulfite is separated from the heparin by standard and well-known methods, such as precipitating heparin from the solution with alcohol, and removing sulfite from the heparin solution by dialysis. The heparin collected after such separation is substantially free from subsequent color formation when said heparin is reconstituted into a sterile, parenterally acceptable solution. Ordinary precautions and care are taken to make certain that the heparin complies with accepted standards of purity and potency.

The following examples are presented to teach the method in operation, but it should be understood that they are not intended as exclusive illustrations.

EXAMPLE I

Three separate batches of heparin (A, B and C) are processed in the following way: Three stock solutions from heparin A ($A_1$, $A_2$ and $A_3$) are prepared by dissolving 5 grams of heparin in 100 cc. distilled water. Heparin solution $A_1$ is set aside as an original untreated sample. To solution $A_3$, 0.5 gm. of sodium hydrosulfite is added, and the resultant mixture is stirred for one-half hour. Thereafter, 103 cc. of 95% 3A alcohol is added, the mixture is stirred and allowed to stand for about 12 hours. The formed precipitate is separated by centrifuging, washed with alcohol and acetone and dried in vacuo. The heparin obtained from this preparation is free of detectable hydrosulfite and has a potency of about 143 units per milligram. Based on this assay, a heparin solution is prepared in normal saline at a concentration of 5000 units per cc.

A solution of heparin $A_2$ is made and similarly reprecipitated; however, no sodium hydrosulfite is added. This precipitated heparin is also dissolved in normal saline at a concentration of 5000 units per cc.

Three similar solutions are each prepared from separate lot B and separate lot C. The resulting nine solutions are allowed to stand for various periods of time and under various conditions of temperature. The color formation developed therein is noted by visual observation and by measurement in a Beckman spectrophotometer at a wave length of 450 m$\mu$. Periodic assays are performed on such solutions to determine if there is any loss in heparin potency.

The following tables indicate the age of the heparin solutions and conditions of temperature. The corresponding color development, as measured by the spectrophotometer, is listed under the column titled "Optical Density." The term "optical density" relates to the concentration of the color-forming bodies present in the sample. The units are the negative log of percent light transmission or 2-log percent T. The percent T is determined by measuring the light transmitted through the sample in terms of percent versus 100 percent transmission through a water blank. The larger the unit, the less light transmission or greater color development. Corresponding heparin potency and visual appearance are listed where such values are determined.

Table I

SOLUTIONS PREPARED FROM HEPARIN A

| Age of heparin solutions and conditions of aging | Heparin solutions | Optical density | Heparin assay (u./cc.) | Visual appearance |
|---|---|---|---|---|
| 68 hours | Original $A_1$ | 0.020 | | Dark. |
| Fresh | Re-ppt $A_2$ | 0.020 | 4,956 | Lighter. |
| Do | Re-ppt+$Na_2S_2O_4$ $A_3$ | 0.021 | 4,886 | Lightest. |
| 10 days At room temp | Original $A_1$ | 0.045 | | Dark. |
| | Re-ppt $A_2$ | 0.020 | | Lighter. |
| | Re-ppt+$Na_2S_2O_4$ $A_3$ | 0.025 | | Lightest. |
| 12 days At room temp | Original $A_1$ | 0.045 | 4,758 | Dark. |
| | Re-ppt $A_2$ | 0.030 | 5,140 | Lighter. |
| | Re-ppt+$Na_2S_2O_4$ $A_3$ | 0.020 | 4,895 | Lightest. |
| 16 days At room temp | Original $A_1$ | 0.050 | | Dark. |
| | Re-ppt $A_2$ | 0.029 | | Lighter. |
| | Re-ppt+$Na_2S_2O_4$ $A_3$ | 0.023 | | Lightest. |
| 28 days At room temp | Original $A_1$ | 0.068 | | Dark. |
| | Re-ppt $A_2$ | 0.031 | | Lighter. |
| | Re-ppt+$Na_2S_2O_4$ $A_3$ | 0.023 | | Lightest. |
| 10 days RT + 2 days at 60° C | Original $A_1$ | 0.170 | | Dark. |
| | Re-ppt $A_2$ | 0.043 | | Lighter. |
| | Re-ppt+$Na_2S_2O_4$ $A_3$ | 0.030 | | Lightest. |
| 10 days RT + 6 days at 60° C | Original $A_1$ | 0.400 | 5,227 | Dark. |
| | Re-ppt $A_2$ | 0.082 | 5,001 | Lighter. |
| | Re-ppt+$Na_2S_2O_4$ $A_3$ | 0.034 | 4,768 | Lightest. |
| 22 days RT + 16 days at 60° C | Original $A_1$ | 1.180 | | Dark. |
| | Re-ppt $A_2$ | 0.388 | | Lighter. |
| | Re-ppt+$Na_2S_2O_4$ $A_3$ | 0.043 | | Lightest. |

Table II

SOLUTIONS PREPARED FROM HEPARIN B

| Age of heparin solutions and conditions of aging | Heparin solutions | Optical density | Heparin assay (u./cc.) | Visual appearance |
|---|---|---|---|---|
| Fresh | Original $B_1$ | 0.058 | | Dark. |
| | Re-ppt $B_2$ | 0.030 | 4,153 | Lighter. |
| | Re-ppt+$Na_2S_2O_4$ $B_3$ | 0.018 | 3,879 | Lightest. |
| 7 days At room temp | Original $B_1$ | 0.075 | | Dark. |
| | Re-ppt $B_2$ | 0.025 | | Lighter. |
| | Re-ppt+$Na_2S_2O_4$ $B_3$ | 0.015 | | Lightest. |
| 10 days At room temp | Original $B_1$ | 0.090 | | Dark. |
| | Re-ppt $B_2$ | 0.025 | | Lighter. |
| | Re-ppt+$Na_2S_2O_4$ $B_3$ | 0.015 | | Lightest. |
| 16 days At room temp | Original $B_1$ | 0.116 | | Dark. |
| | Re-ppt $B_2$ | 0.045 | | Lighter. |
| | Re-ppt+$Na_2S_2O_4$ $B_3$ | 0.026 | | Lightest. |
| 26 days At room temp | Original $B_1$ | 0.157 | | Dark. |
| | Re-ppt $B_2$ | 0.053 | | Lighter. |
| | Re-ppt+$Na_2S_2O_4$ $B_3$ | 0.021 | | Lightest. |
| 10 days RT + 2 days at 60° C | Original $B_1$ | 0.248 | | Dark. |
| | Re-ppt $B_2$ | 0.126 | | Lighter. |
| | Re-ppt+$Na_2S_2O_4$ $B_3$ | 0.057 | | Lightest. |
| 10 days RT + 6 days at 60° C | Original $B_1$ | 0.520 | | Dark. |
| | Re-ppt $B_2$ | 0.242 | | Lighter. |
| | Re-ppt+$Na_2S_2O_4$ $B_3$ | 0.076 | | Lightest. |
| 20 days RT + 16 days at 60° C | Original $B_1$ | 0.980 | 3,639 | Dark. |
| | Re-ppt $B_2$ | 0.555 | 4,099 | Lighter. |
| | Re-ppt+$Na_2S_2O_4$ $B_3$ | 0.197 | 4,183 | Lightest. |

Table III

SOLUTIONS PREPARED FROM HEPARIN C

| Age of heparin solutions and conditions of aging | Heparin solutions | Optical density | Heparin assay (u./cc.) | Visual appearance |
|---|---|---|---|---|
| Fresh | Original $C_1$ | 0.041 | 4,610 | Dark. |
| | Re-ppt $C_2$ | 0.021 | 4,865 | Lighter. |
| | Re-ppt+$Na_2S_2O_4$ $C_3$ | 0.036 | 4,725 | Lightest. |
| 4 days At room temp | Original $C_1$ | 0.038 | 5,203 | Dark. |
| | Re-ppt $C_2$ | 0.034 | 5,442 | Lighter. |
| | Re-ppt+$Na_2S_2O_4$ $C_3$ | 0.014 | 5,231 | Lightest. |
| 10 days At room temp | Original $C_1$ | 0.058 | 5,092 | Dark. |
| | Re-ppt $C_2$ | 0.044 | 4,941 | Lighter. |
| | Re-ppt+$Na_2S_2O_4$ $C_3$ | 0.027 | 5,092 | Lightest. |
| 13 days At room temp | Original $C_1$ | 0.045 | | Dark. |
| | Re-ppt $C_2$ | 0.044 | | Lighter. |
| | Re-ppt+$Na_2S_2O_4$ $C_3$ | 0.017 | | Lightest. |
| 23 days At room temp | Original $C_1$ | 0.057 | | Dark. |
| | Re-ppt $C_2$ | 0.055 | | Lighter. |
| | Re-ppt+$Na_2S_2O_4$ $C_3$ | 0.028 | | Lightest. |
| 10 days RT + 3 days at 40° C | Original $C_1$ | 0.050 | | Dark. |
| | Re-ppt $C_2$ | 0.053 | | Lighter. |
| | Re-ppt+$Na_2S_2O_4$ $C_3$ | 0.025 | | Lightest. |
| 10 days RT + 13 days at 40° C | Original $C_1$ | 0.083 | | Dark. |
| | Re-ppt $C_2$ | 0.086 | | Lighter. |
| | Re-ppt+$Na_2S_2O_4$ $C_3$ | 0.042 | | Lightest. |

The foregoing tables clearly indicate that the reprecipitated and purified heparin solutions ($A_2$, $B_2$, $C_2$) have less color formation than heparin solutions ($A_1$, $B_1$, $C_1$) prepared directly from stock heparin without reprecipitation. This is established both by visual appearance and by the lower color absorption index in the spectrophotometer. It is further to be noted that solutions prepared from reprecipitated heparin treated with 0.1% sodium hydrosulfite ($A_3$, $B_3$, $C_3$) have a substantially lower color formation than solutions prepared from reprecipitated heparin without sodium hydrosulfite treatment. This relationship is maintained over various conditions of room temperature and elevated temperature. The highest color formation develops in samples which stand the longest periods at both room temperature and elevated temperature. However, even at this level of color formation, it is seen that solutions prepared from heparin treated with sodium hydrosulfite ($A_3$, $B_3$, $C_3$) have a substantially lower color index over the next lowest color index as determined for solutions made from reprecipitated heparin without sodium hydrosulfite treatment ($A_2$, $B_2$, $C_2$).

Color formation is noted by both visual appearance and instrumentation. However, the human eye is far more sensitive to color than any apparatus can be. The disadvantage of the eye as a recorder is that it doesn't "remember" color intensity. The eye functions well as a distinguishing agent when several color units are compared side by side. Thus, for any one period of sample aging under given temperature conditions, color formation is noted and distinguished visually. The optical density of the sample is also recorded so the color formation can be "remembered" for subsequent comparison. The color formation as determined by the human eye can be correlated with the instrument's eye, but not strictly. This correlation operates when there is a relatively wide difference between optical density readings. The limited sensitivity of the instrument and the normal experimental error explain the occasional disparity between the indices of the eye and the instrument, especially when the samples are relatively fresh. As the samples become older, the correlation becomes operable.

Heparin potency determinations, as periodically indicated, show that treatment with sodium hydrosulfite does not significantly change heparin potency over the recorded periods.

The dried precipitated heparins obtained from solutions treated with sodium hydrosulfite are free of any detectable sodium hydrosulfite as determined by polarographic examination. The sensitivity of such examination is 0.004% sodium hydrosulfite.

EXAMPLE II

Three separate heparin solutions are prepared in a manner similar to the one followed for preparing parenterally acceptable solutions. The procedure comprises dissolving 0.255 gm. of p-methylaminobenzoate and 0.025 gm. of p-propylaminobenzoate in 100 cc. hot water, cooling said solution and adding thereto 0.56 gm. of analytical reagent grade sodium chloride. The benzoates are preservatives and the sodium chloride raises the osmotic tension of the resulting solution to levels compatible with human plasma. To this mixture, is added between 4.1 and 4.6 gms. of sodium heparin. Some color formation occurs within a short time. The mixture is divided and to one portion is added 0.1% sodium metabisulfite. Reduction of color is immediately noted. Both portions are filtered through a Millipore HA (sterile) filter. Samples treated with metabisulfite and samples without metabisulfite treatment are placed in vials. The vials are stored and a sample therefrom is periodically withdrawn for potency assay.

The following table presents the results of such assay. Sample A represents a control solution without metabisulfite treatment and Sample B represents a solution treated with metabisulfite. Subscripts 1 through 3 indicate the three separate stock solutions.

The data shows that even at the end of a two-month period at 40° C., heparin potency is not deleteriously altered when heparin is treated with sodium metabisulfite.

Table IV

| Samples | Heparin assay 1 month at 40° C., u./cc. | Heparin assay 2 months at 40° C., u./cc. | Comments |
| --- | --- | --- | --- |
| A₁ control | 5,264 | 5,269 | Control shows considerable color development after 2 months. |
| B₁ NaHSO₃ added | 5,264 | 5,353 | |
| A₂ control | 5,398 | 5,353 | |
| B₂ NaHSO₃ added | 5,398 | 5,353 | |
| A₃ control | 4,775 | 4,261 | |
| B₃ NaHSO₃ added | 4,456 | 4,376 | |

EXAMPLE III

A 5% heparin solution is prepared from stock heparin known to develop color. Methyl and propyl aminobenzoates are added as preservatives and the solutions are placed in 10 cc. vials. The vials are divided into five series and each series is treated in the following manner:

A. Control
B. 0.5% phenol added
C. 0.05% $Na_2S_2O_4$ added
D. 0.5% phenol+0.1% $Na_2S_2O_4$ added
E. 0.2% $Na_2S_2O_4$ added The phenol is added to induce color formation and different amounts of sodium hydrosulfite are employed to determine concentration effectiveness of hydrosulfite in removing color. Color formation is apparent in all the vials before addition of sodium hydrosulfite. Sample B is more intense in color because of the added phenol. After addition of sodium hydrosulfite, decolorizing action occurs almost instantly. At all three concentrations of sodium hydrosulfite, the vials are rapidly decolorized and are easily distinguished by visual appearance from the vials containing no sodium hydrosulfite. Sample D, with added phenol as well as hydrosulfite, shows the same decolorizing action.

EXAMPLE IV

Two separate solutions are prepared containing heparin from different tissue sources. One solution contains heparin obtained from the duodenum at a concentration of 5000 units per cc. The other solution contains heparin derived from liver at a concentration of 500 units per cc. Five samples from each solution are prepared according to the following scheme:

Sample A is the control.
Sample B contains 0.1% sodium hydrosulfite.
Sample C contains 0.3% sodium hydrosulfite.
Sample D contains 0.5% sodium hydrosulfite.
Sample E contains 1.0% sodium hydrosulfite.

Decoloration of the heparin samples is noted immediately upon addition of sodium hydrosulfite at all concentrations. While the color formation varies slightly from the sample containing .1% sodium hydrosulfite throughout the range of samples up to 1% sodium hydrosulfite, said variation is slight and difficult to distinguish visually. This indicates that a concentration of 0.1% sodium hydrosulfite is almost as effective as 1% sodium hydrosulfite in removing a color formation. This observation is true for solutions prepared from both liver heparin and duodenal heparin. Observations on color formation are continuously recorded over a four-day period at room temperature and at an elevated temperature (40° C.). Throughout such observations, the same phenomena is noted; namely, the control samples containing no sodium hydrosulfite possess a dark color, whereas samples treated with sodium hydrosulfite are colorless.

The addition of the recited sulfites, bisulfites, metabisulfites, and hydrosulfites to heparin solutions are effective in decolorizing or preventing color formation of various grades of heparin which include crude tissue heparin and repurified heparin. In actual practice, purified and extracted tissue heparin is treated with the color-stabilizing agents of this invention to obtain a high-potency, parenterally acceptable heparin product.

The following example teaches the preparation of such a color-stabilized, pure heparin product.

EXAMPLE V

To a 10% solution of tissue heparin, adjusted to pH 8.5, trypsin is added to remove undigested protein. Following such digestion, insoluble material is removed by centrifuging. The pH is adjusted to 3.0–3.5 to precipitate impurities present in the solution. The precipitate is removed by centrifuging, and the pH is adjusted to 6.3–6.5, at which point heparin is precipitated with 0.9 volume of 3A alcohol. The precipitated and collected heparin is placed in solution and slurried in distilled water, and the mixture is heated to 90° C. The mixture is filtered at elevated temperatures, and the filtrate is adjusted to pH 2.0. Thereafter, the filtrate is filtered through an asbestos bed. The filtrate is neutralized to pH 6.3–6.5 and 1% sodium chloride and 0.25% sodium bisulfite is added. The combined mixture is filtered and the sodium heparin contained therein is precipitated by adding one volume of 3A alcohol. The collected precipitate is washed with 3A alcohol and acetone. The precipitate is dried under vacuum and collected in a yield of 90% with a heparin potency of greater than 120 units per milligram. This heparin product is free from detectable sodium bisulfite.

EXAMPLE VI

A heparin solution is prepared by dissolving 0.225 gm. of p-methylaminobenzoate and 0.025 gm. of p-propylaminobenzoate in 100 cc. of hot water. The solution is cooled and 0.56 gm. of analytical reagent sodium chloride is added. To this mixture, is then added between 4.1 and 4.6 gms. of sodium heparin. Both solutions are buffered with phosphate so that the pH values are approximately equal. The resulting solution is divided, and to one divided portion is added 0.1% sodium metabisulfite. The portion treated with metabisulfite and the portion without metabisulfite treatment are placed in a series of vials. The vials are stored at room temperature and are compared for color development in the Beckman spectrophotometer one year after such storing. The following table lists the optical densities (2-log of percent light transmission) at various wave length readings for the bisulfite treated vials and the non-treated vials:

COLOR DEVELOPMENT AFTER ONE YEAR

| Wave length, mµ | Optical density | | Color factor control/meta-bisulfite treated |
|---|---|---|---|
| | Bisulfite treated | Control | |
| 400 | 0.200 | 0.450 | 2.25 |
| 425 | 0.110 | 0.290 | 2.63 |
| 450 | 0.065 | 0.195 | 3.00 |
| 475 | 0.035 | 0.135 | 3.86 |

The low optical density figure for bisulfite treated heparin indicates little or no color formation, whereas the higher figures for control heparin indicate considerable color formation.

EXAMPLE VII

Original lots of heparin designated A and B are divided. One of the divided portions from each lot is reprecipitated with alcohol by a procedure substantially as provided in Example I. These reprecipitated heparins are called heparin A and heparin B. The other portion from each lot is similarly reprecipitated, but 0.5% sodium hydrosulfite is added before reprecipitation. These hydrosulfite treated heparins are called heparin A' and heparin B'.

From the foregoing heparins, 5% solutions are prepared. Two ml. of each solution is withdrawn and placed in an ampoule to which is added 0.2 ml. of 5.5% phenol. The final volume in the ampoule is 2.2 ml. A number of such ampoules are prepared. One portion of the ampoules is stored in an oven at 60° C. and the remaining portion is stored in an oven at 75° C. Ampoules are periodically removed and measured for color development in a Coleman Model 9 colorimeter. All the samples are read at a wave length of 470 millimicrons. Investigation showed this wave length to give the best correlation with visual evaluation of heparin discolorization.

Figure 2:
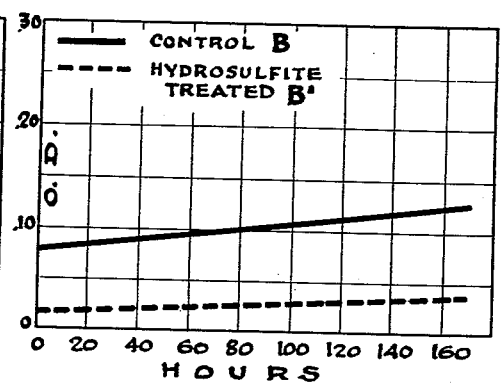

FIGURE 1 of the drawing represents the color development of the sodium hydrosulfite treated heparin A' and the non-treated heparin A over a time period at 60° C. FIGURE 2 shows the same relationship with hydrosulfite treated heparin B' and non-treated heparin B. The ordinates of said graphs represent optical density or the negative log of percent light transmission. The optical density is directly proportional to the concentration of color-forming bodies present in the samples. The abcissa represent time in hours. The lines are drawn to the best visual fit.

It can readily be seen by an examination of these graphs that the hydrosulfite treated heparin solutions develop far less color than the non-treated heparin solutions.

Figure 3:
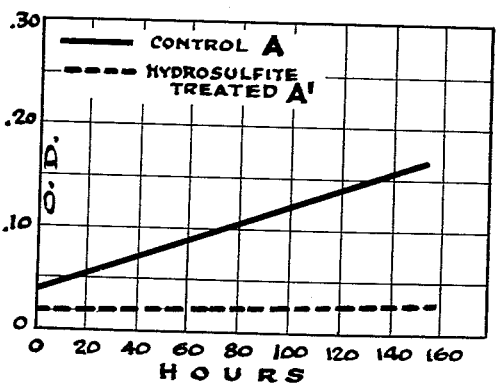
Figure 4:
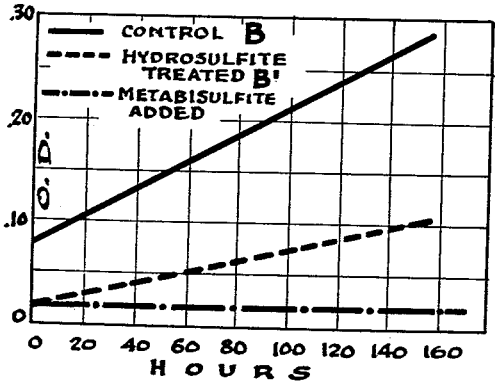

FIGURE 3 and FIGURE 4 of the drawing show the lower color development of sodium hydrosulfite treated heparins A' and B' as compared to non-treated heparins A and B after various aging periods at 75° C. FIGURE 4 also shows the color-inhibiting action after adding sodium metabisulfite to a 5% solution of heparin B, and allowing said metabisulfite to remain therein. The curve for said solution is designated as "Metabisulfite Added." It can be seen in FIGURE 4 that a solution prepared from hydrosulfite treated heparin and a heparin solution with added metabisulfite are both far more color stable than the control solution.

Color stabilization of heparin is achieved by the addition of one of the foregoing alkali sulfites to a parenterally suitable solution of heparin. However, the preferred practice is to precipitate the heparin from solution after it has remained in contact with the sulfite agent for a short period. The processed heparin can then be handled more easily and be available for subsequent reconstitution into solution form prior to actual use. The heparin so prepared is presented in a color-stabilized form which remains visually colorless upon subsequently solubilizing said heparin in an aqueous medium. While the heparin prepared by this process is free from detectable color-stabilizing agents, the method for obtaining such free heparin can be practiced by any of the known separating techniques in the art. This includes dialyzing, precipitating heparin by alcohol and other procedures. The alkali sulfites employed can be selected from the community of sulfite-containing compounds, such as sulfite, bisulfite, hydrosulfite (hyposulphite), metabisulfite (pyrosulfite), formaldehyde sulfoxylate and sulfoxylate.

This invention discloses a process and products derived therefrom. The teaching of heparin color stability applies to solutions containing various concentrations of heparin. The amount of heparin employed in the process is not a necessary element of the invention. The important contribution is the use of the enumerated alkali sulfites in amounts and by the procedure disclosed hereinbefore. In actual practice, heparin solutions of from 1 to 20% are most commonly employed by the practitioners in the field. This foregoing range of heparin concentrations is suitably operable in the practice of the novel process.

Others may practice the invention in any of the numerous ways which will be suggested by this disclosure to one skilled in the art. All such practice of the invention is considered to be a part hereof provided it falls within the scope of the appended claims.

I claim:
1. A method for color stabilizing parenterally suitable heparin comprising placing heparin in an aqueous solution and adding thereto between about 0.05% and 1% of an alkali sulfite, thereafter, separating and isolating the heparin from such mixture.
2. A parenterally suitable heparin substantially free from color-forming bodies as prepared by the process of claim 1.
3. A method for color stabilizing parenterally suitable heparin comprising adding between 0.05% and 1% of an alkali sulfite to a 5%–10% sterile water solution of heparin, maintaining such mixture for about one-half hour at about room temperature; thereafter, separating heparin from said solution substantially free from the added color stabilizer.
4. A method according to claim 3 where the alkali sulfite is sodium metabisulfite.
5. A method according to claim 3 where the alkali sulfite is sodium bisulfite.
6. A method according to claim 3 where the alkali sulfite is sodium hydrosulfite.
7. A heparin product substantially free from color-forming bodies as prepared by the process of claim 3.

References Cited in the file of this patent

UNITED STATES PATENTS

| | | |
|---|---|---|
| 2,041,436 | Schulemann | May 19, 1936 |
| 2,134,679 | Allen | Nov. 1, 1938 |
| 2,540,786 | Kirchmeyer | Feb. 6, 1951 |
| 2,647,928 | Stempel | Aug. 4, 1953 |
| 2,678,899 | Miller | May 18, 1954 |
| 2,719,812 | Hanus | Oct. 4, 1955 |
| 2,899,356 | Greenhalgh | Aug. 11, 1959 |

OTHER REFERENCES

Martin: Remington's Practice of Pharmacy, 1956, Mack Pub. Co., Easton, Pa., p. 554.

D. and C. Ind., vol 49, No. 2, August 1941, p. 213.

U.S. Dispensatory, 25th ed., 1955, Lippincott Co., Philadelphia, Pa., p. 635.

Ser. No. 373,612, Kok (A.P.C.), published May 11, 1943.

UNITED STATES PATENT OFFICE

CERTIFICATE OF CORRECTION

Patent No. 3,039,931                                              June 19, 1962

Stanley H. Beck

It is hereby certified that error appears in the above numbered patent requiring correction and that the said Letters Patent should read as corrected below.

Column 1, line 42, for "provided" read -- providing --; column 2, lines 29 and 30, "in vacuo" should be in italics; column 5, line 9, for "0.255" read -- 0.225 --; same column 5, Table IV, column 4, lines 1 to 3 thereof, "Control shows considerable color development after 2 months." should appear opposite "$A_3$ control" instead of as in the patent; column 6, line 2, for "500" read -- 5000 --.

Signed and sealed this 23rd day of October 1962.

(SEAL)
Attest:

ERNEST W. SWIDER
Attesting Officer

DAVID L. LADD
Commissioner of Patents